United States Patent [19]

Tanaka et al.

[11] 4,349,993
[45] Sep. 21, 1982

[54] MOLDING CLIP ASSEMBLAGE

[75] Inventors: Toshie Tanaka, Machida; Takuo Yuda, Yokohama, both of Japan

[73] Assignee: Nifco Inc., Yokohama, Japan

[21] Appl. No.: 158,209

[22] Filed: Jun. 10, 1980

[51] Int. Cl.³ .............................................. E06B 3/58
[52] U.S. Cl. ..................................... 52/208; 52/397; 52/716; 52/769
[58] Field of Search ......................... 52/208, 769–771, 52/824, 716, 717, 397, 400, 401, 402, 403

[56] References Cited

U.S. PATENT DOCUMENTS

| | | | |
|---|---|---|---|
| 2,119,685 | 6/1938 | Peremi et al. | 52/824 |
| 3,509,666 | 5/1970 | Trout | 52/716 |
| 3,543,465 | 12/1970 | Jackson | 52/716 |
| 3,720,030 | 3/1973 | Krodel | 52/717 |
| 3,911,637 | 10/1975 | Schmidiger | 52/287 |
| 3,968,613 | 7/1976 | Meyer | 52/400 |
| 4,139,971 | 2/1979 | Kimura | 52/208 |
| 4,184,297 | 1/1980 | Casamayor | 52/716 |

Primary Examiner—James L. Ridgill, Jr.
Attorney, Agent, or Firm—Oblon, Fisher, Spivak, McClelland & Maier

[57] ABSTRACT

A molding clip assemblage for mounting a molding about the periphery of a windshield of the type comprising a base plate adapted to be attached to the peripheral edge of the window frame and a plurality of clips adapted to be attached to the base plate at predetermined intervals, the base plate having a recessed part for accommodating the lower part of the clips, the clips being provided with a retaining claw for retaining the outer edge of the molding, with a retaining mechanism for preventing the clip from being extracted from the recessed part of the base after being accommodated therein, and with an operable release member for releasing the engagement of the retaining mechanism, whereby the molding retained by the clips can be released therefrom by manipulating the operable release member.

6 Claims, 8 Drawing Figures

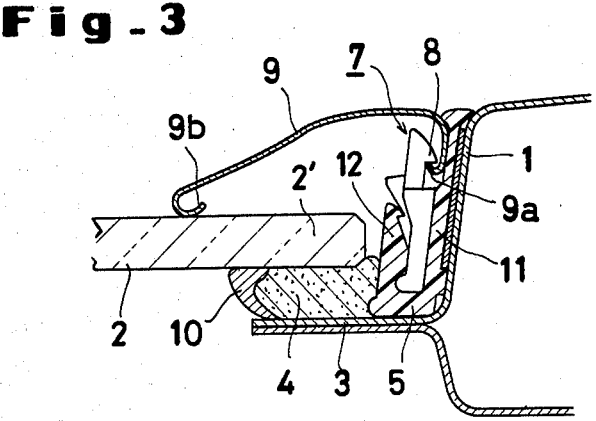
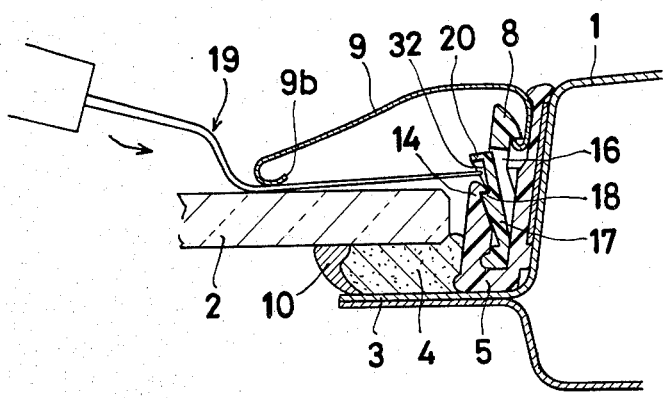

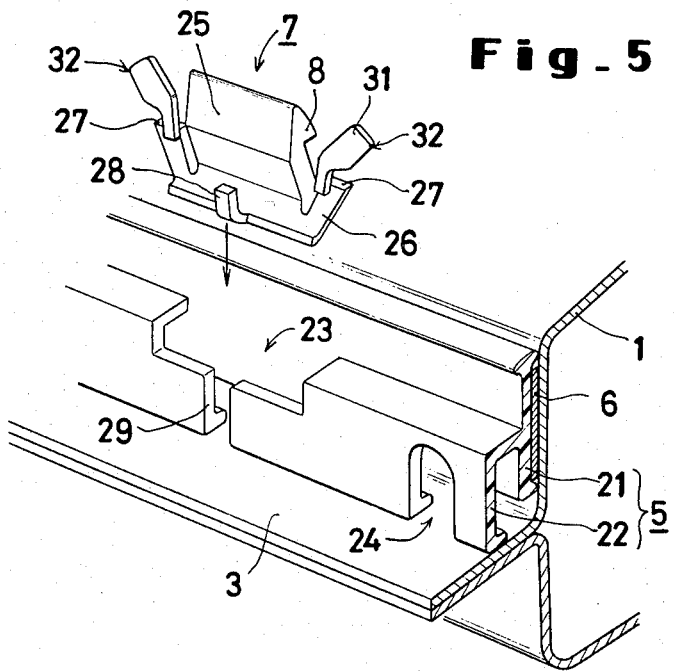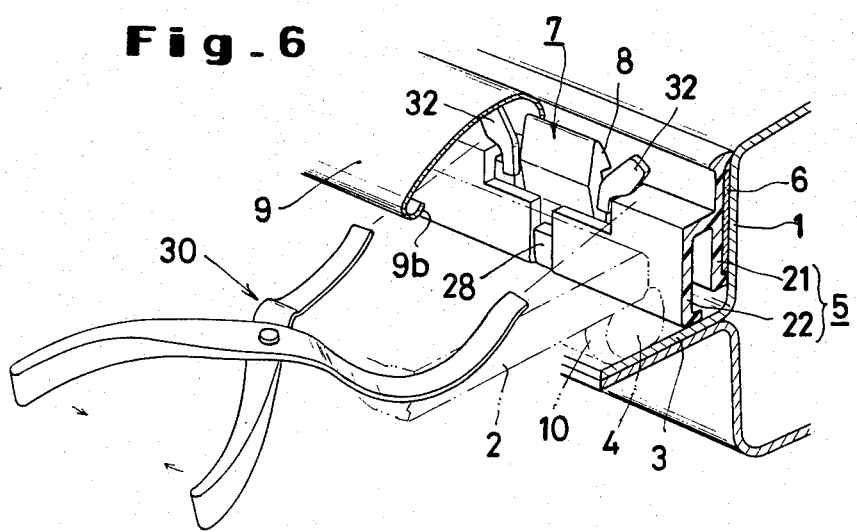

MOLDING CLIP ASSEMBLAGE

BACKGROUND OF THE INVENTION

This invention relates to a molding clip assemblage for mounting a decorative molding in position about the periphery of the windshield or rear window of an automobile.

Description of the Prior Art

There have heretofore been proposed a number of molding clip assemblages for the mounting of a mold about the periphery of a window (by, for example, U.S. Pat. Nos. 3,509,666, 3,543,465, 3,720,030, 3,911,637, 3,968,613, etc.).

Also, the inventors of the present application have previously proposed a molding clip assemblage of this type (U.S. Pat. No. 4,139,971). In mounting a molding about the periphery of a window using this previously proposed molding clip assemblage, a base plate molded from plastic is first attached over the full length of the peripheral edge of the opening to be closed by a glass plate. This attachment is accomplished by using double-faced adhesive tape. Once the upper part of the base plate has been attached so as to cover the upper part of the peripheral edge of the opening, a plurality of clips provided with claw-shaped retaining members for securing the periphery of the molding to the base plate are irremovably attached to the base plate at regular intervals. The glass plate is then deeply inserted into the countersunk region surrounded by the peripheral edge and is fixed by bonding in this position. The edge of the molding is then slipped between the upper part of the molding and the clips, whereby the edge of the molding is retained by the claw-shaped retaining members provided on the clips.

These previously proposed molding clip assemblages have been found to have a disadvantage in that the molding, once attached, cannot be readily detached since the clips which retain the molding are irremovably attached to the base plate. As a consequence, there is no easy way to remove the molding when repair or maintenance work is required in the region surrounding the window.

SUMMARY OF THE INVENTION

The object of the present invention is to provide a molding clip assemblage which, similarly to the previously proposed molding assembly described above, provides effective attachment of a molding about the periphery of a window opening and which, moreover, allows the molding once mounted about the periphery of the window opening to be removed therefrom.

To accomplish the object described above according to the present invention, there is provided a molding clip assemblage including a base plate adapted to be attached to the peripheral edge of a window frame intended for the bonding of a glass plate thereto and a plurality of clips adapted to be attached to the base plate at predetermined intervals, the base plate having a recessed part provided internally with a claw-shaped projection for accommodating the lower part of the clips, the clips each being provided at the upper part thereof with a retaining claw for retaining the outer edge of a molding confronting the upper front surface of the base plate, at the lower part thereof with a step for engaging with the claw-shaped projection of the recessed part when accommodated therein, and at a part thereof which projects above the recessed part with an elongated operable member extending upwardly from the step, which operable member releases the engagement of the step with the claw-shaped projection when pushed by a tool inserted between the free edge of the molding and the upper surface of the glass plate.

Thus, the molding can be easily removed by inserting a tool between the free edge of the molding and the upper surface of the glass plate and then, using this tool, manipulating the operable member to release the engagement between the step on the clip and the claw-shaped projection and thereby freeing both the clip and the molding retained thereby for extraction from the base plate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is a side view of the assemblage shown in FIG. 1 showing the state of attachment of the molding.

FIG. 4 is a cross-sectional view of the assemblage shown in FIG. 1 showing the state of attachment of the molding.

FIG. 5 is a perspective view of a second embodiment of the molding clip assemblage according to the present invention showing the assemblage prior to the attachment of the clips to the base plate.

FIG. 6 is a perspective view with parts cut away of the assemblage shown in FIG. 5 showing the molding in its attached state and also showing one example of a tool for removing the molding.

DETAILED DESCRIPTION OF THE PREFERRED EMBODIMENTS

Figure 1:
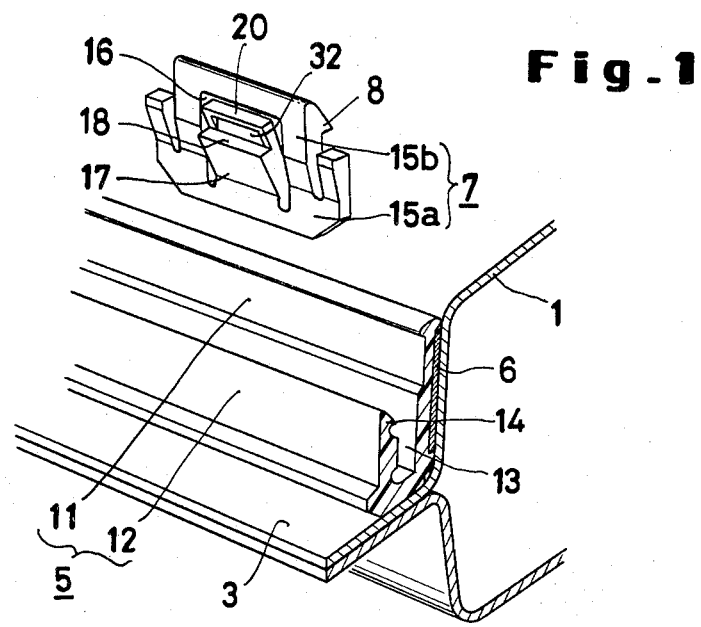
FIG. 1 is a perspective view of a first embodiment of the molding clip assemblage according to the present invention showing the assemblage prior to the attachment of the clips to the base plate.
Figure 2:
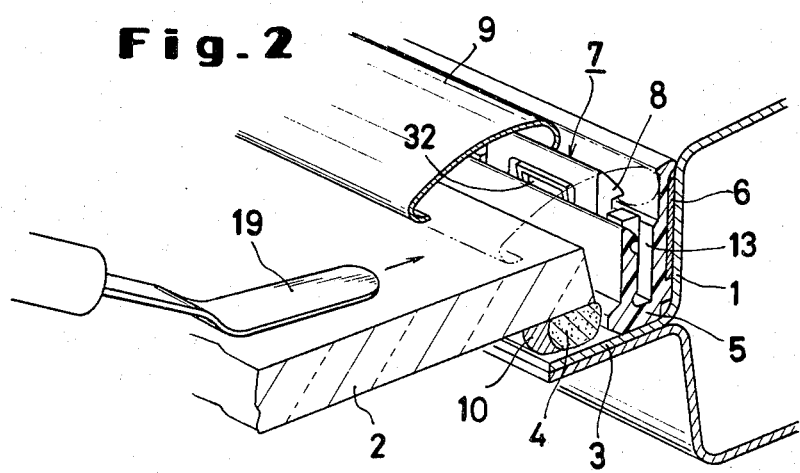
FIG. 2 is a perspective view of the assemblage shown in FIG. 1 showing the molding in its attached state and also showing one example of a tool for removing the molding.

As can be seen from FIGS. 1 through 4, the peripheral edge 1 of an opening for fitting a glass plate 2 which is to serve as the windshield or rear window of an automobile has an inner wall 3 which projects into the opening from the inner portion of the peripheral edge 1. The glass plate 2 is attached to the inner wall 3 by adhesive agent 4. The glass plate 2 is give a configuration which resembles, but is slightly smaller than, the space defined by the peripheral edge 1 so that a gap remains between the edge of the glass plate and the peripheral edge 1. This gap is occupied by a base plate 5 which is attached to the peripheral edge 1 by means of double-face adhesive tape 6 or the like. A plurality of clips 7 are attached to the base plate 5 at appropriate intervals and a molding 9 is then attached in such a manner that its outer edge 9a is retained by retaining claws 8 provided on the clips 7 while its inner free edge 9b comes into pressing engagement with the edge 2' of the glass plate 2. In some cases, a rubber seal 10 is provided to extend between the bottom surface of the edge of the glass plate 2 and the upper surface of the inner wall 3 in order to prevent the adhesive agent 4 from protruding beyond the inner edge of the inner wall 3.

The base plate 5 of the first embodiment of the molding clip assemblage in accordance with the present invention is molded of plastic to have a generally J-shaped cross-section, the long, vertical stroke of the "J" constituting a high rear wall 11 the back surface of which is attached to the peripheral edge 1 by means of the adhesive tape 6. The rear wall 11 is sufficiently high to reach the upper extremity of the peripheral edge 1. The short, vertical stroke of the "J" constitutes a low front wall 12 and the space between the front and rear walls constitutes a groove 13 left open at the top for accommodation of the clips 7. The clips 7 are inserted into the groove 13 from above and are prevented from being withdrawn upwardly by a claw 14 provided at the upper part of the back of the front wall 12.

The base plate 5 can thus be obtained by extrusion molding a length of plastic material having a J-shaped cross-section with the part thereof corresponding to the front wall 12 being provided with a claw 14 at the upper part of the back surface thereof, and then cutting the extruded length of material into appropriate lengths. The base plate 5 can also be obtained by injection molding.

The clip 7 is integrally molded of plastic to have a lower part 15a which is accommodated within the groove 13 of the base plate 5 and an upper part 15b which projects above the upper edge of the groove. The aforementioned retaining claw 8 for retaining the outer edge 9a of the molding 9 between itself and the upper front surface of the rear wall 11 of the base plate 5 is formed on the back of the upper part 15b. The clip 7 moreover has an incised slit 16 formed in the shape of a "U" laid sidewise and extending from the upper part 15b to the lower part 15a. The provision of this slit 16 creates a tongue 17 which has its free end facing upwardly and which is provided with a step 18 at a position on the lower part 15b which permits it to engage with the claw 14 on the base plate 5. As shown in the figures, the tongue 17 is slanted forward in its free, unstressed state but, at the time the clip 7 is inserted into the groove 13, is first pushed back and made to stand vertically by the force exerted thereon by the claw 14 of the base plate 5 and is then allowed to snap back to its initial forward slanted position so that the step 18 engages claw 14 from below.

Thus, when a number of the clips 7 are inserted into the groove 13 of the base plate 5 at appropriate intervals, the outer edge of a continuously formed molding 9 can be inserted to be retained by the retaining claws of the clips 7 so as to retain the molding 9 in position about the periphery of the glass plate 2.

For the sake of ease in explanation, in the above description it has been assumed that the glass plate 2 is attached first and that the attachment of the base plate 5 and the clips 7 is carried out thereafter. However, it is, of course, also possible to fix the glass plate 2 in place after the base plate 5 has been attached to the peripheral edge and, if necessary, after the clips 7 has been fitted at appropriate intervals into the base plate 5. Since, as was described earlier, the tongue 17 is provided to extend from the upper part 15b to the lower part 15a of the clip 7, the upper part of the tongue 17 projects above the top of the groove 13 of the base plate 5 at the time the clip 7 is inserted fully into the groove 13 in its finally attached state. Therefore, when necessary, the molding 9 can be removed by inserting a thin, flat tool 19 between the free edge 9b of the molding 9 and the upper surface of the glass plate 2. If the upper end of the tongue 17 is then pressed back by the tool, the step 18 of the tongue 17 is freed from the claw 14 of the base plate 5 so that both the molding 9 and the clips 7 attached thereto by the retaining claws 8 can be extracted from the base plate 5 by application of an upward prying force on the molding 9. If in this embodiment of the invention the tongue 17 is provided at the upper part thereof with an integrally formed visor-shaped catch 20, the tool 19 can first be used to press back on the tongue 17 at a point beneath the catch 20 to thereby release the step 18 from the claw 14 of the base plate 5 and then, once this release has been accomplished, the tool 19 can be pried upwardly to engage the catch 20 and extract the clip 7 from the groove 13 of the base plate 5. As, in actual practice, these two operations of the tool can be accomplished with a single motion, it is extremely easy to extract the plurality of clips attached around the glass plate 2.

In the second embodiment of the invention illustrated in FIGS. 5 and 6, the base plate 5 is molded of plastic to have a generally h-shaped configuration and to include a high rear wall 21 of sufficient height to reach the upper extremity of the peripheral edge 1 and a low, step-like front wall 22 having the shape of an "L" laid sidewise. Further, the base plate 5 of this embodiment has spaced openings 23 for receiving the clips 7 provided at appropriate intervals in the upper surface of the front wall 22. To assure that the h-shaped base plate 5 will not mar the paint finish near the upper part of the peripheral edge 1, it is molded with, for example, the upper part of the rear wall being of soft plastic and the remaining parts being of hard plastic by means of the double extrusion method. The molded strip is then cut to the required lengths which are processed to provide them with the openings 23.

If it is found necessary to provide the base plate 5 with better bendability so as to permit its use in cases where the peripheral edge 1 is concavely or convexly curved, this can be accomplished by forming cut-away portions 24 in the front face of the front wall 22 and the lower part of the rear wall 21. These cut-away portions are preferably formed between each adjacent pair of openings 23.

As the clip for use with this base plate, it is preferable to use a plastic clip 7 which, as shown in the figure, includes a central piece 25 provided on its back surface with a retaining claw 8, a pair of ears 26 provided integrally with the central piece 25 to slant outwardly one from the right and one from the left of the lower part of the central piece 25, and a pair of claws 27 provided on the ears 26 midway of the height thereof, the clip 7 including these members being so arranged that, when it is pushed into the opening 23 of the base plate 5 from above, the pair of ears 26 come into contact with and are pressed inwardly by the left and right edges of the opening 23 up to the point where the claws 27 pass by these edges, whereafter the claws 27 snap back to their initial outwardly slanted positions and the clip 7 thus reaches its final, fully inserted state. In this state, which is shown in FIG. 6, the ears 26 and the upper portion of the central member bearing the retaining claw 8 project above the level of the front wall 22. Also in this embodiment, a projection 28 has been provided on the lower, front surface of the central member 25 to serve as a positioner and guide, and a guide slot 29 for receiving the projection 29 has been provided in the front wall 22 of the base plate 5 as a continuation of the opening 23.

Thus, once the back surface of the base plate 5 has been attached to the peripheral edge 1, if the lower part of the clip 7 is inserted into the opening 23 with its projection 28 aligned with the guide slot 29 and the clip 7 is then pushed downward, the claws 27 of the ears 26 will, as described above, come into catching engagement with the side edges of the opening 23 so that the clip becomes unextractably fastened within the base plate 5. When a plurality of such clips have been inserted into the base plate 5 at appropriate intervals, a molding can be attached about the periphery of the glass plate 2 by inserting its outer edge 9a between the retaining claws 8 of the clips 7 and the front surface of the rear wall 21.

When it is desired to remove the molding from the periphery of the window, the thin tongs of a scissor-like tool 30 are inserted between the free edge 9b of the molding 9 and the upper surface of the glass plate 2 and, using this tool, the upper portions 32 of the ears 26 (which constitute the operable members in this embodiment) are squeezed inwardly to release the engagement between the claws 27 and the edges of the opening 23 and are then pulled upwardly to raise the clip 7 out of the base plate 5. A catch 32 can be provided on each of the ears 26 to assure that the tool 30 does not slip off during the upward pulling operation.

Figure 7:
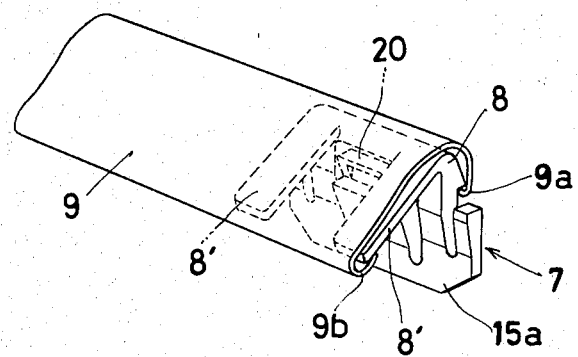
FIG. 7 is a perspective view of a third embodiment of the molding clip assemblage according to the present invention showing the attachment of the clips to the molding and FIG. 8 is a cross-sectional view showing the attachment of the clips of FIG. 7 to the base plate.
Figure 8:
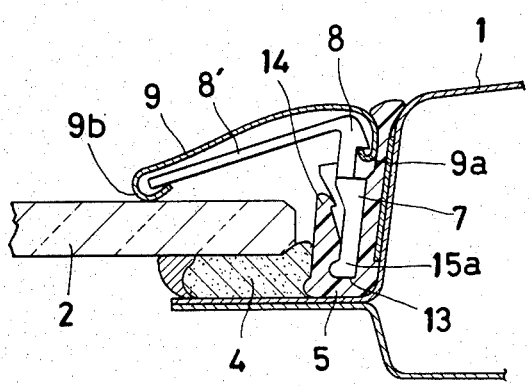

In the aforementioned embodiment of the molding clip assemblage according to the present invention, a plurality of clips 7 are inserted into the base plate 5 at appropriate intervals and thereafter the outer edge 9a of the molding 9 is engaged with the retaining claws 8 of the clips. The molding may be attached to the periphery of a window by forming projections 8' each protruding from the upper edge of the back of the retaining claw 8 of the clip 7 so as to be fitted in the inner surface of the molding 9, causing a plurality of clips to engage in advance with the molding and inserting the lower half 15a of the clip into the groove 13 of the base plate 5 which has been attached to the peripheral edge 1, as shown in FIGS. 7 and 8.

Thus as has been described in the foregoing, in the present invention, it is possible to manipulate an operable member (i.e. the upper part of a tongue member or the upper parts of a pair of ear members) to release the engagement of a step or claw member provided on a clip for holding the clip in a recessed part, such as a groove or opening, of a base plate so that the clip can be removed from the base plate. Thus the present invention provides a molding clip assemblage which, differently from conventional clip assemblages, makes it possible to remove a once-attached molding.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding clip assemblage for a molding member which is removable by a tool comprising:
a base plate attached to the peripheral edge of a window frame for the bonding of a glass plate thereto;
a plurality of removable clips attached to the base plate at predetermined intervals wherein the base plate is J-shaped in cross section and further comprises a rear wall of predetermined height for attachment to the peripheral edge of the window frame and a front wall of lower height than said predetermined height of said rear wall, a front surface portion of the rear wall and a back surface portion of the front wall defining a recessed part for accommodating lower portions of each of the clips wherein an upper part of the back surface of the front wall further comprises a claw, wherein each of said clips further comprise a retaining claw at an upper part thereof for retaining one edge of said molding member and a step extending therefrom at the lower part for engagement with the claw of the front wall of the base plate and wherein each of said clips further comprises release means extending upwardly from the step to protrude from the recessed part of the base plate for releasing engagement between the claw of the base plate and the step of each of the clips such that each of the clips are removable from the recessed part of the base plate by inserting said tool between the other edge of the molding and the upper surface of the glass plate and pushing the release means of each of said clips with said tool.

2. The molding clip assemblage according to claim 1, wherein each of the clips further comprises a U-shaped cut extending from the upper part to the lower part thereof and an upwardly directed tongue formed by said cut, wherein the step is provided midway of the height of the tongue to face forward, and an upper part of the tongue above the step comprises said release means.

3. The molding clip assemblage according to claim 2, further comprising a forward-facing catch provided at an upper end portion of the tongue of each of the clips for receiving said tool used in lifting each of the clips.

4. A molding clip assemblage for a window frame and a molding member which is removable by a tool comprising:
a base plate attached to a peripheral edge of said window frame for bonding of a glass plate thereto;
a plurality of removable clips attached to the base plate at predetermined intervals wherein the base plate is h-shaped in cross section and further comprises a rear wall of a predetermined height for attachment to the peripheral edge of the window frame and a front wall of a height less than said predetermined height of said rear wall and of the shape of an L laid sidewise, an upper surface portion of the front wall having a plurality of openings formed therein for accommodating lower parts of each of the clips wherein each of the clips further comprise a central piece having a retaining claw provided at an upper part of the back surface thereof for retaining one edge of said molding member and a pair of ears formed integrally with the central piece and projecting slantingly outwardly one each from first and second opposite sides thereof, wherein each of the pair of ears further comprise at an intermediate part thereof a shoulder-shaped claw for engagement with the underside of one edge of the opening in the upper surface of the front wall of the base plate, and wherein the upper part of each ear above the claw further comprises release means for releasing engagement between the shoulder-shaped claw and the underside of one edge of the opening such that each of the clips are removable from the openings of the base plate by inserting said tool between the other edge of the molding member and the upper surface of the glass plate and bending the release means of each of the pair of ears toward each other.

5. The molding clip assemblage according to claim 4, further comprising an outwardly protruding catch provided at the upper end of each ear for receiving the tool used in lifting up the removable clip.

6. The molding clip assemblage according to any of claims 1, 2 or 4, wherein the upper part of the rear wall of the base plate comprises soft synthetic resin material and remaining parts of the base plate comprise hard synthetic resin material.

* * * * *